(12) United States Patent
Risoldi et al.

(10) Patent No.: US 12,299,619 B2
(45) Date of Patent: May 13, 2025

(54) ADAPTIVE ENTERPRISE RISK EVALUATION

(71) Applicant: Merck Sharp & Dohme LLC, Rahway, NJ (US)

(72) Inventors: Mark Joseph Risoldi, Princeton, NJ (US); Sethuraman Balasubramanian, Monmouth Junction, NJ (US)

(73) Assignee: Merck Sharp & Dohme LLC, Rahway, NJ (US)

( * ) Notice: Subject to any disclaimer, the term of this patent is extended or adjusted under 35 U.S.C. 154(b) by 383 days.

(21) Appl. No.: 16/894,627

(22) Filed: Jun. 5, 2020

(65) Prior Publication Data

US 2020/0311630 A1 Oct. 1, 2020

Related U.S. Application Data

(63) Continuation-in-part of application No. 16/688,732, filed on Nov. 19, 2019, now Pat. No. 11,995,593.
(Continued)

(51) Int. Cl.
| | |
|---|---|
| *G06Q 10/0635* | (2023.01) |
| *G06F 3/0482* | (2013.01) |
| *G06F 21/57* | (2013.01) |
| *G06F 30/20* | (2020.01) |
| *G06F 111/10* | (2020.01) |
| *G06Q 10/0637* | (2023.01) |
| *H04L 41/22* | (2022.01) |

(52) U.S. Cl.
CPC ....... *G06Q 10/0635* (2013.01); *G06F 3/0482* (2013.01); *G06F 21/577* (2013.01); *G06F 30/20* (2020.01); *G06Q 10/06375* (2013.01); *G06F 2111/10* (2020.01); *G06F 2221/033* (2013.01); *G06F 2221/034* (2013.01); *H04L 41/22* (2013.01)

(58) Field of Classification Search
CPC .................................................. G06Q 10/0635
See application file for complete search history.

(56) References Cited

U.S. PATENT DOCUMENTS

| | | | |
|---|---|---|---|
| 8,256,004 B1 * | 8/2012 | Hill | G06Q 10/00 726/25 |
| 9,292,695 B1 | 3/2016 | Bassett | |

(Continued)

OTHER PUBLICATIONS

Shahriar, Hossain, and Mohammad Zulkernine. "Mitigating program security vulnerabilities: Approaches and challenges." ACM Computing Surveys (CSUR) 44.3 (2012): 1-46. (Year: 2012).*

(Continued)

*Primary Examiner* — Andre D Boyce
(74) *Attorney, Agent, or Firm* — Fenwick & West LLP

(57) ABSTRACT

An adaptive risk management application retrieves data corresponding to an asset. The asset is a computing device or software application of an enterprise system. The adaptive risk management system identifies a set of vulnerabilities of the asset. For each vulnerability in the set of vulnerabilities, the adaptive risk management application generates a recommendation for mitigating the vulnerability. The adaptive risk management application generates a user interface for the asset. The user interface comprises a list of the recommendations. The adaptive risk management system provides the user interface for display.

17 Claims, 9 Drawing Sheets

Related U.S. Application Data

(60) Provisional application No. 62/772,608, filed on Nov. 28, 2018.

(56) References Cited

U.S. PATENT DOCUMENTS

| | | | |
|---|---|---|---|
| 10,749,891 B2 | 8/2020 | King-Wilson | |
| 10,817,604 B1 | 10/2020 | Kimball et al. | |
| 10,848,515 B1 | 11/2020 | Pokhrel et al. | |
| 10,868,825 B1* | 12/2020 | Dominessy | H04L 43/065 |
| 11,070,582 B1* | 7/2021 | Berger | H04L 63/1433 |
| 2012/0180133 A1* | 7/2012 | Al-Harbi | H04L 63/1433 726/25 |
| 2014/0337971 A1 | 11/2014 | Casassa Mont et al. | |
| 2016/0119373 A1 | 4/2016 | Fausto et al. | |
| 2016/0205122 A1 | 7/2016 | Bassett | |
| 2016/0234229 A1* | 8/2016 | Carpenter | H04L 63/1416 |
| 2016/0234239 A1* | 8/2016 | Knapp | H04L 41/06 |
| 2016/0239665 A1* | 8/2016 | Hamby | G06F 21/577 |
| 2017/0034023 A1 | 2/2017 | Nickolov et al. | |
| 2017/0366572 A1 | 6/2017 | Dereszynski et al. | |
| 2017/0346846 A1* | 11/2017 | Findlay | H04L 63/20 |
| 2018/0020021 A1* | 1/2018 | Gilmore | H04L 63/1408 |
| 2018/0041533 A1* | 2/2018 | Chesla | H04L 63/1433 |
| 2018/0322584 A1 | 11/2018 | Fellows | |
| 2018/0351987 A1* | 12/2018 | Patel | G06F 21/577 |
| 2019/0020686 A1* | 1/2019 | Cohen | H04L 63/20 |
| 2019/0222597 A1* | 7/2019 | Crabtree | H04L 63/1425 |
| 2019/0236661 A1* | 8/2019 | Hogg | G06Q 30/0282 |
| 2020/0050986 A1* | 2/2020 | Vescio | G06Q 10/0635 |
| 2020/0252423 A1* | 8/2020 | Hogg | G06N 20/20 |
| 2020/0265145 A1* | 8/2020 | Slabyak | G06F 30/20 |
| 2020/0274894 A1* | 8/2020 | Argoeti | G06F 21/6218 |
| 2020/0314134 A1* | 10/2020 | Izrael | G06F 21/554 |
| 2020/0356678 A1* | 11/2020 | Gourisetti | G06F 21/577 |
| 2020/0396254 A1* | 12/2020 | Crabtree | G06F 16/951 |
| 2020/0404013 A1* | 12/2020 | Waplington | H04L 63/1433 |
| 2020/0410001 A1* | 12/2020 | Sarkissian | G06F 16/903 |
| 2020/0412758 A1* | 12/2020 | Trivellato | H04L 63/1441 |
| 2021/0021644 A1* | 1/2021 | Crabtree | H04L 63/1441 |
| 2021/0037038 A1* | 2/2021 | Alsharif | A61B 34/30 |
| 2021/0084057 A1* | 3/2021 | Chhabra | H04L 63/1416 |
| 2021/0089647 A1* | 3/2021 | Suwad | G06F 21/577 |
| 2021/0110319 A1* | 4/2021 | Gourisetti | G06F 21/577 |
| 2021/0152588 A1* | 5/2021 | Cruz | G06F 8/65 |
| 2021/0168175 A1* | 6/2021 | Crabtree | G06F 16/2477 |
| 2021/0200870 A1* | 7/2021 | Yavo | G06N 5/04 |
| 2021/0211450 A1* | 7/2021 | Aleidan | H04L 63/1433 |
| 2021/0211452 A1* | 7/2021 | Patel | H04L 63/1433 |
| 2021/0234885 A1* | 7/2021 | Campbell | H04L 41/16 |
| 2021/0264034 A1* | 8/2021 | Jones | G06F 21/577 |
| 2021/0273957 A1* | 9/2021 | Boyer | G06N 3/04 |
| 2021/0273968 A1* | 9/2021 | Shaieb | H04L 63/1433 |
| 2021/0273978 A1* | 9/2021 | Hadar | G06F 21/577 |

OTHER PUBLICATIONS

Upadhyay, Darshana, and Srinivas Sampalli. "SCADA (Supervisory Control and Data Acquisition) systems: Vulnerability assessment and security recommendations." Computers & Security 89 (2020): 101666. (Year: 2020).*

Feng, Nan, Harry Jiannan Wang, and Minqiang Li. "A security risk analysis model for information systems: Causal relationships of risk factors and vulnerability propagation analysis." Information sciences 256 (2014): 57-73. (Year: 2014).*

Hilson, D. et al., "Practical Project Risk Management: The ATOM Methodology," Management Concepts Press, 2012, 11 pages, Second Edition (with cover page and table of contents).

Joint Task Force Transformation Initiative, "Managing Information Security Risk: Organization, Mission, and Information System View," NIST Special Publication SP 800-39, Mar. 2011, 88 pages.

Perkins, T., "Managing Financial Trouble," Morgan Stanley Journal of Applied Corporate Finance, Fall 2007, three pages, vol. 19, No. 4 (with table of contents).

Rausand, M., "Chapter 1: Introduction, Risk Assessment: Theory, Methods, and Applications," John Wiley & Sons, Inc., 2011, 26 pages, First Edition.

Securityscorecard, "Understand and reduce risk with the world's most expansive & scalable cybersecurity ratings platform," undated, 10 pages, [Online] [Retrieved on Mar. 11, 2020], Retrieved from the Internet <URL: https:/securityscorecard.com/>.

Noel, S. et al. "Measuring Security Risk of Networks Using Attack Graphs." International Journal of Next-Generation Computing, vol. 1, No. 1, Jul. 2010, pp. 135-147.

United States Office Action, U.S. Appl. No. 16/688,732, filed Dec. 17, 2021, 22 pages.

United States Office Action, U.S. Appl. No. 16/688,732, filed Mar. 31, 2022, 31 pages.

United States Office Action, U.S. Appl. No. 16/688,732, filed Aug. 25, 2022, 35 pages.

* cited by examiner

| Particular Asset Panel 900 | Detailed Information Panel 905 |
| --- | --- |
| Asset 805A  [ 87 ] | IP Address: 12.34.56.789   Location: California, USA |
| | Type: Server X1Y2 |

Recommendations Panel 910

Recommendation 912   Data Source 914   Importance 916

Installed Applications Panel 920

Installed Application 922   Version 924   Publisher 926

Risk Factors and Mitigations Panel 930

Tactic 932   Technique 934   Risk Mitigations 936

*FIG. 9*

ADAPTIVE ENTERPRISE RISK EVALUATION

CROSS REFERENCE TO RELATED APPLICATIONS

This application is a continuation-in-part of U.S. patent application Ser. No. 16/688,732, (now U.S. Pat. No. 11,995,593), filed Nov. 19, 2019, which claims the benefit of U.S. Patent Application No. 62/772,608, filed Nov. 28, 2018, both of which are incorporated by reference herein.

TECHNICAL FIELD

The disclosure generally relates to the field of cybersecurity and in particular to automated adaptive risk management systems.

BACKGROUND

Modern information technology (IT) architectures typically include a large number of systems, processes, and individuals connected to form a complex system-of-systems. The presence of individuals and organizations determined to exploit the systems to conduct unauthorized or malicious activity in the system adds a substantial layer to the complexity of the problem of protecting the system-of-systems from attack. To estimate the vulnerability of a system and quantify the risk associated with it, an enormous number of factors need be considered. It is not sufficient to simply consider the vulnerabilities by themselves—there is also a need to understand how these vulnerabilities relate.

While the threats themselves are constant, the approaches employed by threats are continually changing in an effort to thwart conventional cybersecurity systems. Moreover, conventional cybersecurity systems may be slow to react to new and evolving threats and even slower to recommend responses to those new threats.

SUMMARY

An adaptive risk management application retrieves data corresponding to an asset. The asset is a computing device or software application of an enterprise system. The adaptive risk management application identifies a set of vulnerabilities of the asset. The adaptive risk management application determines, for each identified vulnerability, a likelihood of a threat actor successfully exploiting the vulnerability. The adaptive risk management application determines, based on the likelihoods, a risk score for the asset. The adaptive risk management application sends the risk score for display. The adaptive risk management system performs a Monte Carlo simulation to determine the risk score in some embodiments. The adaptive risk management application may scrape threat intelligence data from external sources.

BRIEF DESCRIPTION OF THE DRAWINGS

FIG. 9 is a simplified example of a user interface for asset-level risk reduction, according to one embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

I. System Overview

Figure 1:
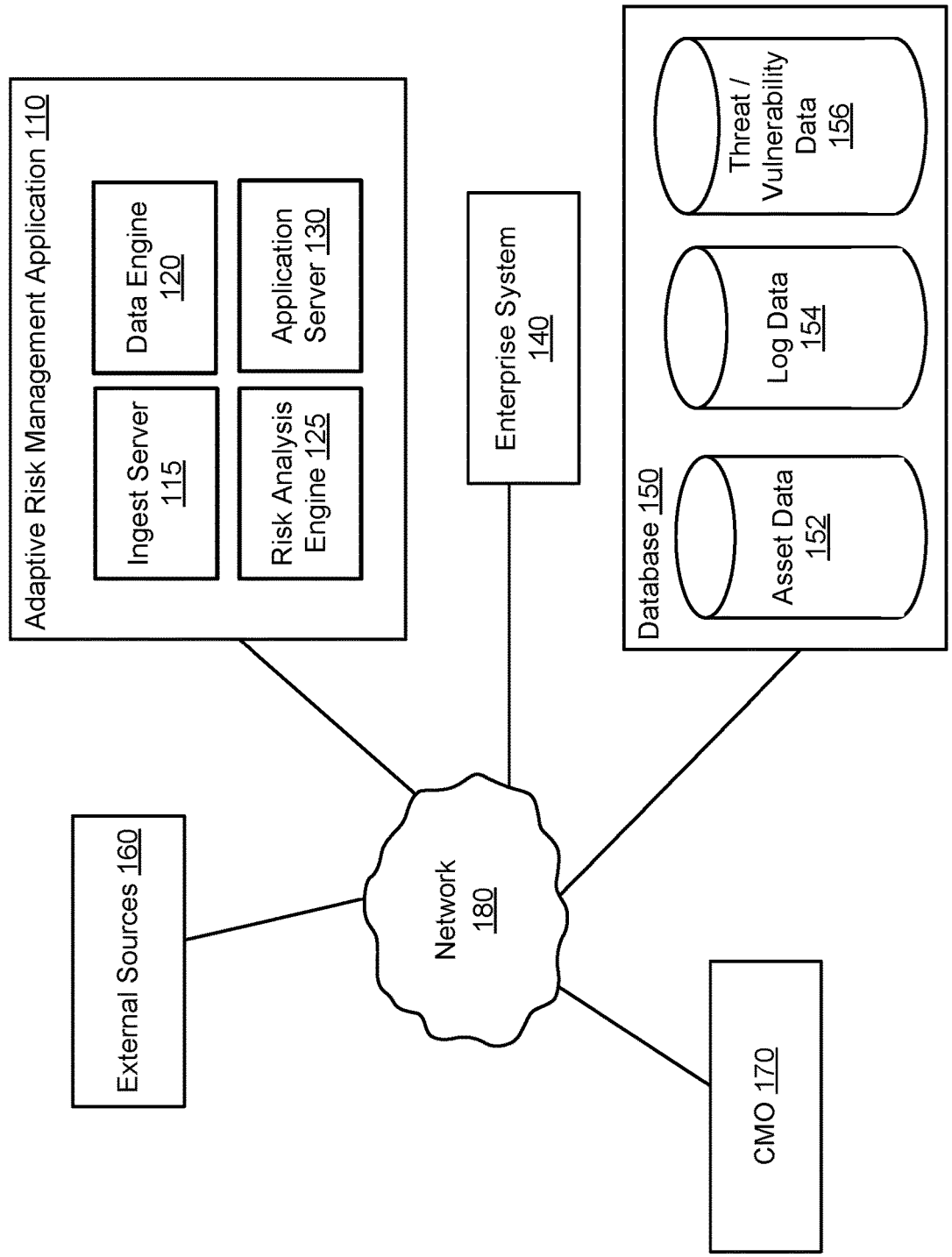
FIG. 1 is a block diagram illustrating a system including an adaptive risk management application, according to one embodiment.

FIG. 1 is a block diagram illustrating a system including an adaptive risk management application 110, according to one embodiment. The system includes the adaptive risk management application 110 ("ARM 110"), a database 150, one or more external sources 160, an enterprise system 140, and a contract manufacturing organization 170 ("CMO 170"), collectively connected to a network 180. In alternative embodiments the system may include more, fewer, or other components. For example, in some embodiments, the system does not include any CMOs 170, and in some embodiments the ARM 110 and/or database 150 are integrated into the enterprise system 140. In alternative embodiments, different components may provide functionality described herein without straying from the concepts described herein.

The network 180 may comprise any combination of local area and/or wide area networks, using both wired and/or wireless communication systems. In one embodiment, the network 180 uses standard communications technologies and/or protocols. For example, the network 180 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 180 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 180 may be represented using any suitable format, such as hypertext markup language (HTML) or extensible markup language (XML). In some embodiments, all or some of the communication links of the network 180 may be encrypted using any suitable technique or techniques.

The enterprise system 140 is a system of computing devices of an enterprise. The enterprise may be, for example, a business, a charity, a university, or another organization. The computing devices are "assets" of the enterprise system 140, such as employee laptops, internal servers, and enterprise databases. Large enterprise systems 140 may include hundreds or thousands of assets. As described below, each asset may have one or more vulnerabilities capable of exploitation by threat actors, such as hackers that attempt to access privileged information of the enterprise system 140. Some or all of the enterprise system 140 may be deployed using a cloud computing platform, such as AMAZON WEB SERVICES (AWS). Cloud computing devices used by the enterprise system 140 are assets of the enterprise system 140.

The CMO 170 is a contract manufacturing organization, which is a third-party vendor that works for the enterprise system 140 on a contract basis to provide services. For example, the CMO 170 may be a pharmaceutical company that manufactures a drug for the enterprise system 140. Typically, CMOs 170 have access to at least some of the assets of the enterprise system 140, such as an internal server with privileged files pertaining to the drug for production. As such, CMOs 170 can serve as access points for threat actors to intrude the enterprise system 140. Though described with respect to a CMO 170, alternative embodiments may include multiple CMOs 170, or other third-party vendors with similar access to the enterprise system 140 for which the techniques described herein apply.

The external sources 160 are sources of data for the ARM 110. For example, the external sources 160 may be the National Institute of Standards and Technology (NIST), particularly the National Vulnerability Database (NVD). Depending upon the embodiment, any number of external sources 160 may be employed, such as MITRE, CROWDSTRIKE, FIREEYE, MICROSOFT, SYMANTEC, ESET, KASPERSKY, SECURITYSCORECARD, and/or other cybersecurity data sources. Data from the external sources 160 may be collected via Open Source Intelligence (OSINT) feeds and/or web scrapers, e.g., APACHE NIFI, and may be stored partially or wholly in the database 150.

The database 150 is a data store for various data used by the ARM 110. Depending upon the embodiment, the database 150 may be one central repository, or may include multiple computing nodes, such as a set of database servers. Furthermore, any of a variety of database technologies may be employed, such as POSTGRESQL, DYNAMODB, and ELASTICACHE. Database 150 includes asset data 152, log data 154, and threat and vulnerability data 156.

Asset data 152 is information pertaining to assets of the enterprise system 140. The asset data 152 includes metadata such as identifiers for each asset, software installed on each asset (e.g., operating system), and the versions of the installed software. This information may be gathered by a data engine 120, described in greater detail below, by querying assets of the enterprise system 140. For example, asset data 152 may be collected using MICROSOFT SYSTEM CENTER CONFIGURATION MANAGER.

Log data 154 is historic information pertaining to risk events, such as instances of hacks or other actions by threat actors. The data may include the affected assets and the techniques employed by the threat actors. The log data 154 can further include historic risk information, such as past risk calculations for various assets. As described below with reference to FIG. 2, the log data 154 is used to update event likelihood calculations. Log data 154 may be collected by the data engine 120 from a variety of sources, such as CISCO firewall logs, QUALYS, CISCO INTRUSION DETECTION SOLUTION, CISCO SOURCEFIRE, MCAFEE WEB GATEWAY proxy logs, WINDOWS event logs, Domain Name System (DNS) and Dynamic Host Configuration Protocol (DHCP) logs, MICROSOFT ACTIVE DIRECTORY, MCAFEE EPO, CISCO NETFLOW, TRIPWIRE, CYLANCE, CISCO IRONPORT, JUNIPER virtual private network (VPN) logs, CISCO ESTREAMER, AWS CLOUDTRAIL, CISCO TACACS, and the SPLUNK PCI INDEX, SPLUNK PAM INDEX, and SPLUNK SOX INDEX.

Threat and vulnerability data 156 is cybersecurity information about threat actors, vulnerabilities, exploits, and attack patterns. Threat and vulnerability data 156 includes lists of known software vulnerabilities from the NVD, which is gathered by an ingest server 115 described below. Each software vulnerability has a common vulnerabilities and exposures (CVE) identifier as well as a set of corresponding metrics for the software vulnerability. The set of corresponding metrics are based on the common vulnerability scoring system (CVSS). CVSS metrics are standardized indices for evaluating cybersecurity threats. Threat and vulnerability data 156 may be further enriched by adjustments by subject matter experts, such as cybersecurity experts managing the ARM 110.

The ARM 110 evaluates the risk facing an enterprise system 140 of threat actors gaining access to privileged information or assets to which the threat actors are not permissioned. The ARM 110 evaluates risk on a variety of scales to comprehensively contextualize the risk of the enterprise system, allowing fine-grained risk visualization. In an embodiment, the ARM 110 evaluates risk of different parts of the enterprise system 140, such as:

1. The enterprise system 140 as a whole
2. Each division
3. Each market
4. Each region
5. Each crown jewel (key technology assets)
6. Each third-party vendor
7. Each business process
8. Each asset type
9. Each asset
10. Each asset by threat name Risk is a combination of assets (and their applications and potential vulnerabilities), threats (and their motivations and capabilities), and affected business processes (and the function of that process in the entity). Each may be expressed algorithmically as the product of likelihood and impact and then summed linearly or weighted in order to access overall risk. Asset vulnerabilities, together with motivated, capable threats, determine the likelihoods of exploits. The application, and the value of the function of that application, provides the impact. The application may be a business application in some enterprise systems 140. Further, the value may be financial or some other measure of value, e.g., safety, as quantified by a cybersecurity expert, e.g., an administrator of the ARM 110.

In one example embodiment the ARM 110 is configured to quantify each of the above noted components such that the risk associated with an arbitrary asset in the enterprise system 140 (or more likely, groups of assets) can be assessed as well as updated to reflect the influence of external factors (e.g., increased threat actor activity, identified exploit attempts on an entity's machines) and internal factors (e.g., security controls). To accomplish this, in one example embodiment, the risk analysis engine 230 takes a data-driven approach by incorporating and analyzing, for example, asset data 152, log data 154, and threat and vulnerability data 156, as described below.

In the embodiment shown in FIG. 1, the ARM 110 includes an ingest server 115, a data engine 120, a risk analysis engine 125, and an application server 130. The ingest server 115 extracts information for the ARM 110 from external sources 160. For example, the ingest server 115 uses APACHE NIFI to download data from the NVD and SECURITYSCORECARD and stores it in the database 150. For example, the ingest server 115 may collect asset identifiers from the asset database 152 and query the NVD for threat data pertaining to the assets using the asset identifiers, and download any returned information to the database 150.

The data engine 120 manages internal and external sources of data used to compute risk. The data engine 120 retrieves data from the database 150 and provides it to the risk analysis engine 125. In an embodiment, the data engine 120 periodically analyzes the assets of the enterprise system 140 and determines whether data pertaining to one or more assets is out of date, incomplete, or lacking from the database 150. If so, the data engine 120 instructs the ingest server 115 to retrieve the relevant data, e.g., using a Common Vulnerabilities and Exposures (CVE) identification number of an asset to query the NVD for threat actor information pertaining to the asset. The risk analysis engine 125 calculates risk scores, and is described in greater detail below with reference to FIG. 2. Some or all of the ARM 110 may be deployed using a cloud computing system, such as AWS.

The application server 130 uses risk scores from the risk analysis engine 125 to generate user interfaces representing the risk scores. The application server 130 generates user interfaces displaying current risk scores and, in some embodiments, historic risk scores, for some or all of the different parts of the enterprise system 140 enumerated above. The application server 130 may update the user interfaces periodically, such as every eight hours, to display refreshed risk scores, e.g., newly calculated risk scores. The application server 130 may specifically generate user interfaces detailing the risk scores of third-party vendors, and send alerts (e.g., to managers of the ARM 110) when the risk scores of third-party vendors reach or exceed a threshold risk score value.

The user interfaces generated by the application server 130 may include metrics and statistics relevant to the risk scores, such as graphs tracking risk scores over time for various parts of the enterprise system 140. The user interfaces may represent the factors involved in calculating risk scores. For example, for a particular asset, a user interface generated by the application server 130 may include a list of the vulnerabilities associated with the asset, as determined based on NVD data. Additional metadata about assets may be displayed as well, e.g., a user of the enterprise system 140 associated with the asset, as well as the asset's associated division of the enterprise, geographic location, geographic market, and so on.

The user interfaces generated by the application server 130 may include articles, posts, feeds, etc. from external sources 160, e.g., cybersecurity news headlines scraped from a cybersecurity website. In an embodiment, upon selection of external source 160 content, the ARM 110 uses a hyperlink associated with the content to open a webpage at the originating external source 160 page.

The ARM 110 can detect and react to input actions such as cursor selections and text entry. For example, the user interfaces generated by the application server 130 may include a search field for searching assets within the enterprise system 140, where searching for an asset and subsequent selection of an indicator of the asset loads a user interface detailing the risk information of the asset, e.g., its risk score. In an embodiment, one or more user interfaces generated by the application server 130 expose a some or all of the database 150 for peruse and/or manipulation by a user of the ARM 110. For example, the user can access information in the threat and vulnerability data 156 pertaining to threat actor tactics, techniques, and procedures, and may change or update data in the database 150. As a particular example, the user may add information about a new threat actor to the database 150, where the information is not in the NVD. In an embodiment, a user interface generated by the application server 130 visualizes the assets of the enterprise system 140, e.g., visualizes a topology of the enterprise system 140 as a graph of nodes and edges, where nodes indicate assets and edges represent connections between assets. For example, an employee laptop may be connected to an internal server, which is connected to several business processes and a crown jewel application. The crown jewel application, in turn, may be connected to internal servers pertaining to a division of the enterprise system 140, and so on.

In an embodiment, one or more user interfaces generated by the application server 130 visualize a hierarchy of portions of the enterprise system 140, e.g., the portions listed in paragraph 24, and through interaction with the hierarchy visualization, the user interface will navigate to a deeper level of the hierarchy to represent risks on a more micro level. For example, a top level of the hierarchy may be an overall risk to the enterprise system. A second level may be each division of the enterprise system. If a particular division has an unusually high risk, a user may select the division. Upon receipt of the selection, the application server 130 adjusts the user interface to the markets, types of assets, and/or individual assets, etc., involved in the division. In this manner, a particular factor (e.g., one market versus anther, employee laptops versus internal servers, or a particular laptop) can be identified as contributing to the unusually high risk score. Depending upon the embodiment, the hierarchy may be structured differently, to represent a different topology of the enterprise system 140.

Figure 2:
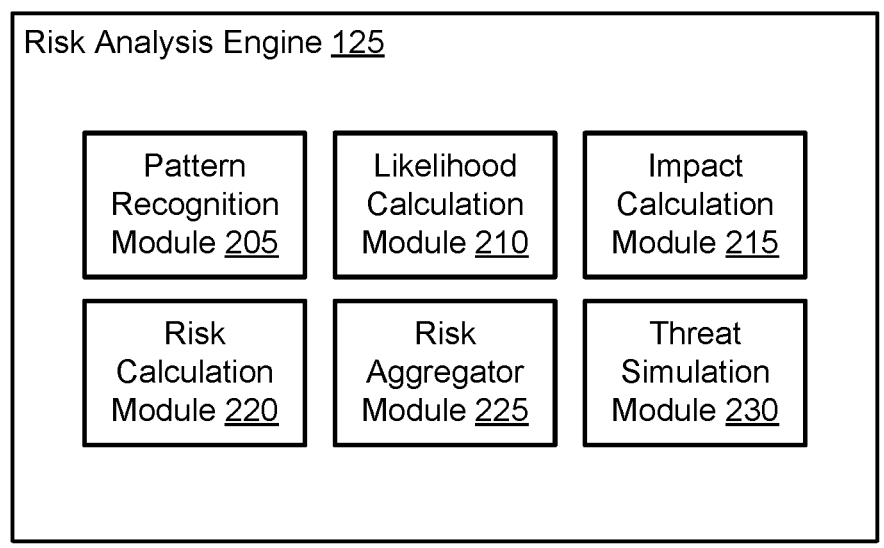
FIG. 2 is a block diagram illustrating a risk analysis engine of an adaptive risk management application, according to one embodiment.

FIG. 2 is a block diagram illustrating a risk analysis engine ("RAE") 125 of an adaptive risk management application 110, according to one embodiment. The RAE 125 includes a pattern recognition module 205, a likelihood calculation module 210, an impact calculation module 215, a risk calculation module 220, risk aggregator module 225, and a threat simulation module 230. The RAE 125 calculates risk scores for assets of the enterprise system 140 and simulates threat scenarios to produce indices of asset vulnerability to exploitation.

The RAE 125 evaluates risk for the enterprise system 140. In an embodiment the RAE 25 evaluates the risk according to the formula:

risk=likelihood×impact where likelihood is the likelihood of a successful attack and impact is a quantified measure of the potential harm caused by a successful attack.

The pattern recognition module 205 evaluates data from the database 150, particularly log data 154, to detect existing or potential threats. The pattern recognition module 205 evaluates log records of past threats, e.g., past instances of attack upon the enterprise system 140. For example, the pattern recognition module 205 can determine whether certain threats have higher rates than expected. If so, threat and vulnerability data 156 for those threats are updated, e.g., to have higher likelihood of occurrence. The pattern recognition module 205 may determine a type of threat actor, a treat technique employed, and so on for each recognized threat.

The pattern recognition module 205 also evaluates log records for potential threats, such as whether particular assets or sets of assets of the enterprise system 140 are particularly vulnerable to particular threats. For example, the pattern recognition module 205 may evaluate different partitions of assets, e.g., assets corresponding to a certain market, to determine whether those assets are particularly susceptible to one or more threats, as evidenced by higher rates of particular attacks upon those assets than in other markets. The RAE 125 may update threat information in the database 150 based on detected attack patterns.

The likelihood calculation module 210 calculates likelihoods involved in risk scoring. The following paragraphs describe an embodiment in which the likelihood calculation module 210 calculates the likelihood of an attack attempt by a threat actor ($L_a$), and the likelihood that an attempted attack is successful ($L_s$), and the likelihood that cybersecurity controls are effective to protect against the attack ($L_c$). The overall likelihood (L) of an attack is calculated as:

$$L = L_a \times L_s \times (1 - L_c).$$

Various values may be used for $L_c$. In particular, failure of the security system to stop the attack corresponds to $L_c=0$, the security system disrupting the attack corresponds to $L_c=0.5$, and the security system denying the attack or recovering from the attack corresponds to $L_c=1$. Depending upon the embodiment, the likelihood calculation module 210 may determine residual and/or inherent risk. Residual risk uses L, whereas inherent risk is risk without factoring for $L_c$.

In an embodiment, calculating the likelihood of an attack attempt involves the likelihood calculation module 210 evaluating the formula:

$$L_a = \frac{1}{D_a}[s_i S_i + t_m T_m + t_{ti} T_{ti} + t_{ts} T_{ts} + \\ t_{tr} T_{tr} + t_r^a T_r + t_i^a T_i + t_{ro}^a T_{ro} + t_{ls} T_{ls} + e_m^a E_m + a_{ip}^a A_{ip}]$$

where lowercase variables are model coefficients and uppercase variables are metric values for a particular threat actor, threat, and target (e.g., an asset). $S_i$ represents the technical impact of the attack, $T_m$ represents the threat actor motive, $T_{ti}$ represents targeted industries, $T_{ts}$ represents targeted sectors, $T_{tr}$ represents targeted region, $T_r$ represents threat actor resources, $T_i$ represents threat actor infrastructure, $T_{ro}$ represents threat actor region of operation, $T_{ls}$ represents when the threat actor was last seen, $E_m$ represents whether the threat is included in METASPLOIT, and $A_{ip}$ represents the targeted asset's last internet protocol (IP) subnet. The model coefficients may be set by users of the ARM 110. Determination of the metric values is described below. $D_a$ is a normalization factor and is the sum of the model coefficients.

Calculating the likelihood of attack success involves the likelihood calculation module 210 evaluating the following formula:

$$L_s = \frac{1}{D_s}[s_e S_e + t_s T_s(e_{cm} E_{cm} + t_t T_t + t_c T_c) + \\ t_r^s T_r + t_i^s T_i + e_m^s E_m + t_{ro}^s T_{ro} + t_t T_t a_{ip}^s A_{ip}]$$

where lowercase variables again are model coefficients and uppercase variables again are metric values for a particular threat actor, threat, and target (e.g., an asset). $S_e$ represents the exploitability score of the attack, $T_s$ represents threat actor sophistication, $E_{cm}$ represents the maturity of the vulnerability of the exploit code, $T_c$ represents threat actor capabilities, $T_t$ represents the threat actor toolset, and $T_i$ represents threat actor infrastructure. The remaining metric values are described with reference to $L_a$. $D_s$ is a normalization factor and is calculated as:

$$D_s = s_e + t_s(e_{cm} + t_t + t_c) + t_r^s + t_i^s + t_{ro}^s + a_{ip}^s.$$

To calculate $L_c$, the likelihood calculation module 210 identifies the operating system and software installed on the asset by querying the database 150, particularly, the asset data 152. The likelihood calculation module 210 uses the retrieved data to query a list of known software vulnerabilities from the NVD, which is stored in the threat and vulnerability data 156. Any corresponding vulnerabilities are identified using the associated CVE identifier. The likelihood calculation module 210 retrieves the CVSS metrics associated with the CVE identifier. Using the CVSS metrics associated with the CVE identifier, the likelihood calculation module 210 identifies which security controls may be in place that address the vulnerability. The likelihood calculation module 210 polls the database 150 to determine whether any of those security controls are in place. Based on the determination, an $L_c$ value is set, as described above (e.g., denying the attack, disrupting the attack, and so on).

To calculate $S_i$, the likelihood calculation module 210 extracts the CVSS impact score $S_i'$ from the retrieved CVSS metrics and transforms the CVSS impact score, as follows:

$$S_i = 1 - \frac{S_i'}{6}.$$

To calculate $S_e$, the likelihood calculation module 210 extracts the CVSS exploitability score $S_e'$ from the retrieved CVSS metrics and transforms the CVSS exploitability score, as follows:

$$S_e = 1 - \frac{S_e' - 0.1}{3.8}.$$

$T_m$, $T_r$, $T_i$, $T_{ls}$, $T_s$, and $T_{ro}$ are extracted by the likelihood calculation module 210 from the threat and vulnerability data 156 and converted to numeric values based on preset threat/value pairs set by an administrator of the ARM 110. $T_{ti}$, $T_{ts}$, and $T_{tr}$ are extracted by the likelihood calculation module 210 from the likelihood calculation module and converted to numeric values based on threat/value pairs set by an administrator of the ARM 110 and then modified based on weights set by administrators of the ARM 110 corresponding to threat relevance to the enterprise system 140, where more relevant threats are weighted more greatly. $A_{ip}$ is determined based on asset data 152 and converted to a numeric value based on an amount of network exposure of the asset, as set by an administrator of the ARM 110. For example, internal servers have lower network exposure than mobile devices of employees, and so have lower numeric values.

$E_{cm}$ is determined by the likelihood calculation module 210 by extracting its value directly from the retrieved CVSS metrics.

$T_s$ is determined by the likelihood calculation module 210 based on threat and vulnerability data 156 corresponding to the threat and converted to numeric values based on tool/value pairs set by an administrator of the ARM 110. The values may be based on an exploitive power of the tool, where more exploitative tools correspond to higher values.

$T_c$ is determined by the likelihood calculation module 210 based on a list of techniques associated with the threat actor in the threat and vulnerability data 156 corresponding to the threat indicating whether the threat is capable of performing the technique. If the threat technique is in the list, $T_c$ is set to 1, otherwise it is set to 0.

$E_m$ is determined by the likelihood calculation module 210 based on whether the threat is in METASPLOIT. The likelihood calculation module 210 checks the threat and vulnerability data 156 and sets $E_m$ to 0 or 1 depending on whether or not the threat is present. One of skill in the art will recognize modifications that may be made to some or all of the above equations that may be used in other embodiments without deviating from the disclosed principles.

The impact calculation module 215 calculates the impact (I) of the threat. Impact values are set by administrators of the ARM 110 or are determined based on set impact values and a topology of assets. For example, the impact of a threat to an employee asset may have a first impact value, whereas the impact of a threat to a crown jewel application may have a second impact value. The second impact value may be divided among N nodes hosting the crown jewel application, and production nodes may be weighted higher than non-production nodes. Weights may be set by an administrator of the ARM 110. Impact values may be divided equally among assets supporting a business process for which risk score is being determined. In an embodiment, each asset in the enterprise system 140 has its own impact value.

In an embodiment, the risk calculation module 220 calculates the risk for a threat to take advantage of a particular vulnerability of a particular asset. In an embodiment, the risk calculation module 220 does this by performing R=L×I. The risk calculation module 220 scales this risk value R to produce a risk score on a scale of 0 to 100. The risk calculation module 220 does this according to the formula:

$$R_i' = \frac{L \times I}{L_{max} \times I}$$

where $L_{max}=1$, the highest likelihood that a successful attack occurs (100%). In simpler form, therefore, $R_i'=L$. Then the risk calculation module 220 applies the formula:

$$f=100\times(1-L)$$

where f is the scaled risk score.

The risk aggregator module 225 aggregates risks for a set of exploits associated with an asset. In an embodiment, the risk aggregator module 225 aggregates risk for a set of N exploits for an asset, i=1 to N, to produce a total risk ($R_{tot}$) according to:

$$R_{tot} = \frac{\sum I_i}{N} \times \frac{\sum L_i}{N}$$

In an embodiment, the threat simulation module 230 uses a Monte Carlo approach to simulate attacks upon the enterprise system 140. For a given asset topology of the enterprise system 140, the threat simulation module 230 evaluates risk at each asset in the topology, randomly testing various scenarios based on the likelihoods of success of exploitation of vulnerabilities at each asset. CMO's 170 and other third-party vendors are treated as threat actors, with a likelihood of successful entry to the enterprise system 140 based on a likelihood of the CMO 170 being successfully hacked. For this likelihood, the threat simulation module 230 extracts a SECURITYSCORECARD score for the CMO 170 from the database 170, which is on a scale of 50 to 100, and converts it to a metric $S_{cmo}$ which is on a scale of 0.8 to 1. The threat simulation module 230 uses random sampling to determine whether an attack is successful at each vulnerability in the asset topology, and generates a probability distribution of how likely a particular asset is to be reached via other assets in the topology based on the cumulative risks of the other assets, for example, how likely a crown jewel application is to be reached by a hack.

II. Attack Modeling

Figure 3:
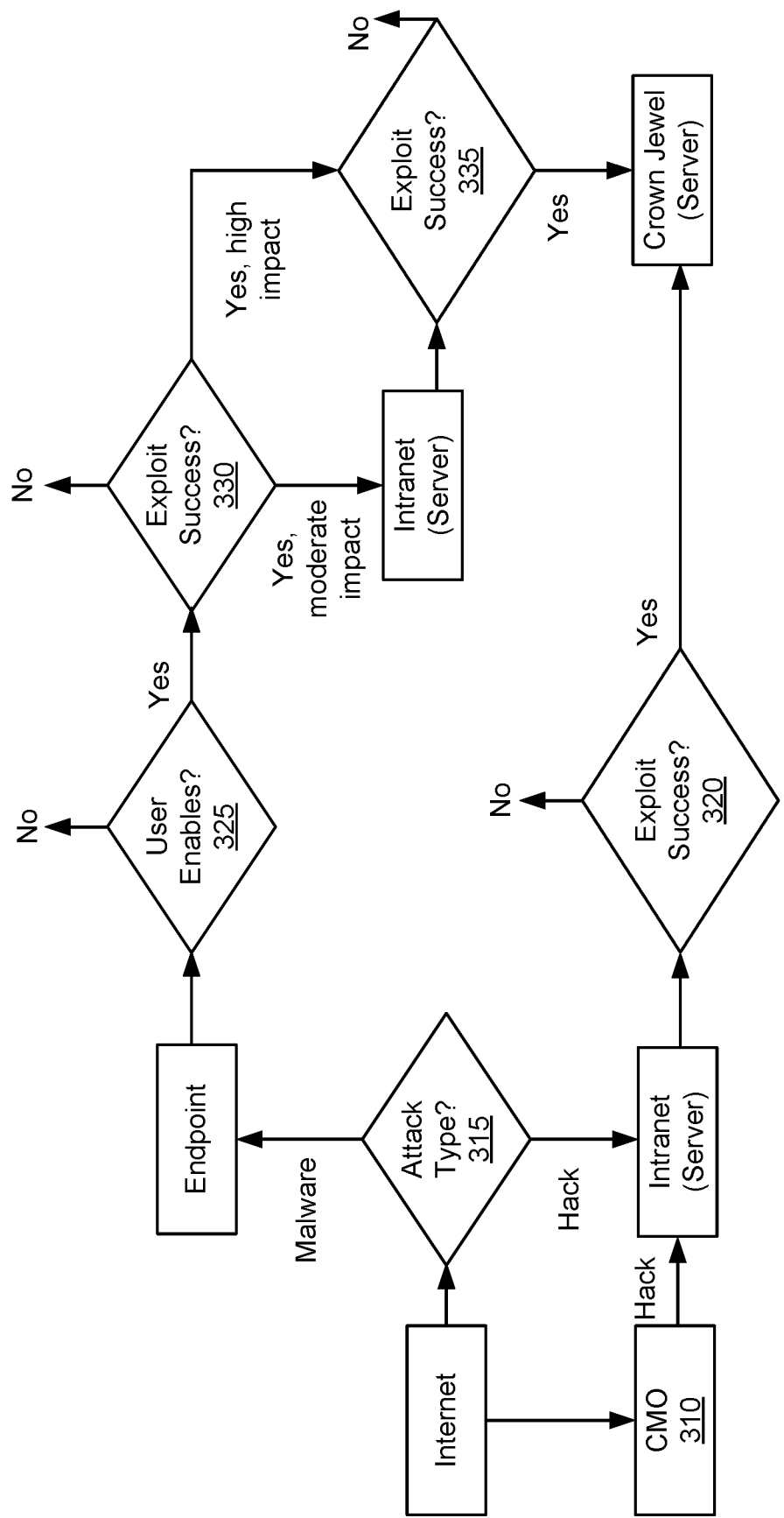
FIG. 3 is a flowchart illustrating a model attack graph, according to one embodiment.

FIG. 3 is a flowchart illustrating a model attack graph 300, according to one embodiment. The ARM 110 simulates threat scenarios affecting assets of the enterprise system 140, as described above with reference to FIG. 2. FIG. 3 illustrates one example evaluation of a threat scenario, modeling the possible attacks upon the involved assets. FIG. 3 includes a model attack graph 300 illustrating an asset topology including a CMO, an endpoint, an intranet server, and a crown jewel application server. The model attack graph 300 includes various paths that could be taken during an attack. If an attack originates at the CMO, the threat simulation module 230 determines whether the CMO is hacked stochastically. If, on a particular pass of the Monte Carlo simulation, the CMO is hacked 310, the attack continues to the intranet server. If the intranet server is successfully exploited 320 (again determined stochastically), the hack reaches the crown jewel server. However, if the exploit 320 is not successful, the attack is disrupted.

Alternatively, an attack 315 may approach through an endpoint, such as malware on an employee laptop, or a hack directly into an intranet server. For the endpoint scenario, the threat simulation module 230 stochastically determines whether user enablement 325 of the exploit occurs. If not, the attack is disrupted. If the user of the endpoint is determined to enable 325 the hack, a further exploit success 330 is determined. A moderately successful exploit accesses the intranet server, or a highly successful exploit reaches the crown jewel server. Whether via the intranet server or directly from the endpoint to the crown jewel server, the exploitation 335 of the crown jewel server is simulated. Each path through the model attack graph 300 is randomly attempted as determined by stochastic evaluation of each potential exploit, based on the likelihood of each potential exploit. After many passes through the model attack graph 300, the threat simulation module 230 generates a probability distribution of the crown jewel server being exploited 335.

III. Processes

Figure 4:
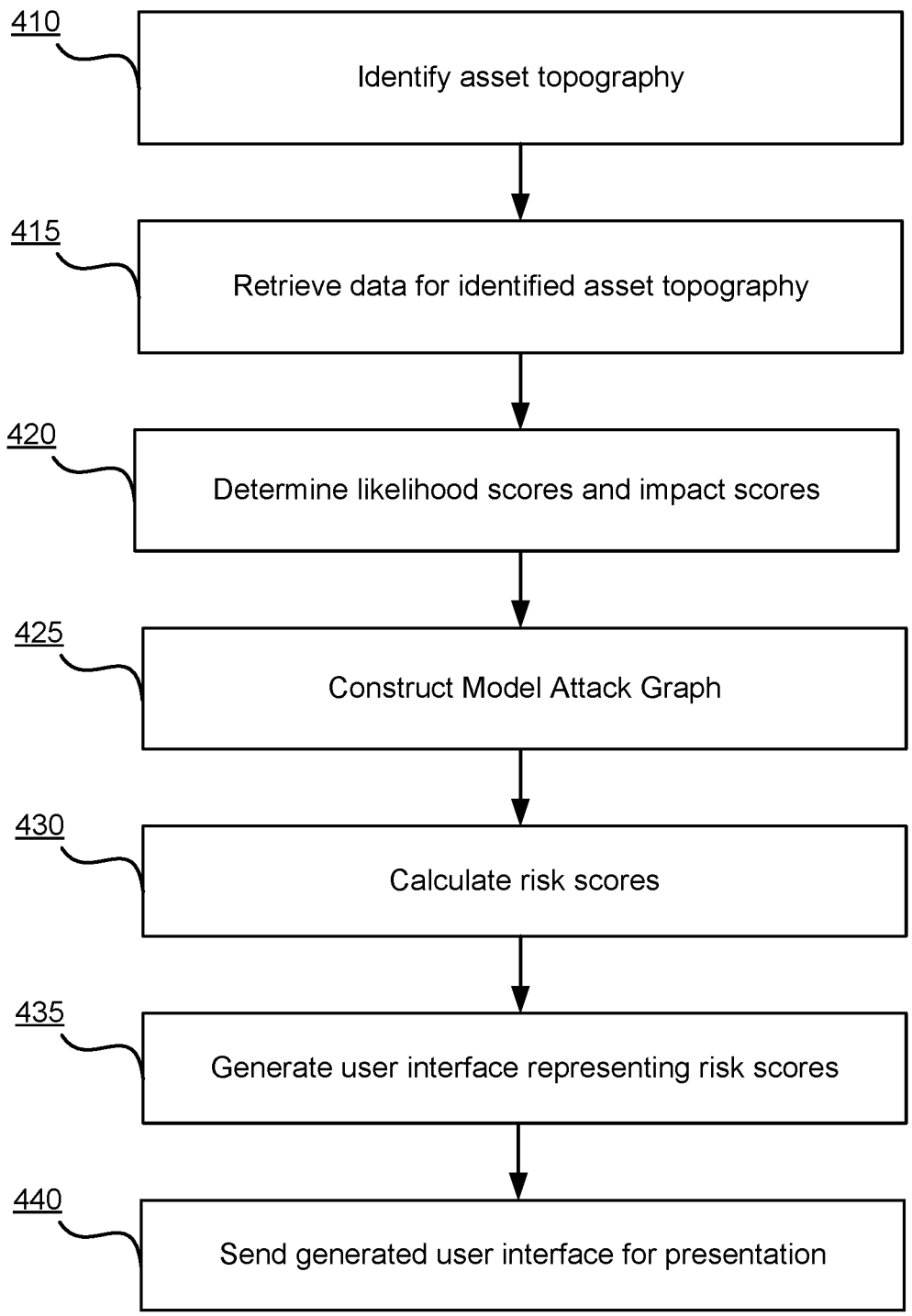
FIG. 4 is a flowchart illustrating a process for adaptive risk assessment, according to one embodiment.

FIG. 4 is a flowchart illustrating a process for adaptive risk assessment, according to one embodiment. The ARM 110 identifies 410 an asset topography for evaluation. The ARM 110 retrieves 415 data for the assets of the identified asset topography from the database 150. The ARM 110 determines 420 likelihood scores and impact scores for the assets. The ARM 110 constructs 425 a model attack graph for the asset topography and calculates 430 risk scores for the assets, including performance of a Monte Carlo simulation to attain a likelihood of attack for a top node of the asset topography, such as a crown jewel application, based on a fraction of successful simulations. The ARM 110 generates 435 a user interface representing the risk scores and sends 440 the generated user interface for presentation, e.g., to an asset of the enterprise system 140.

Figure 5:
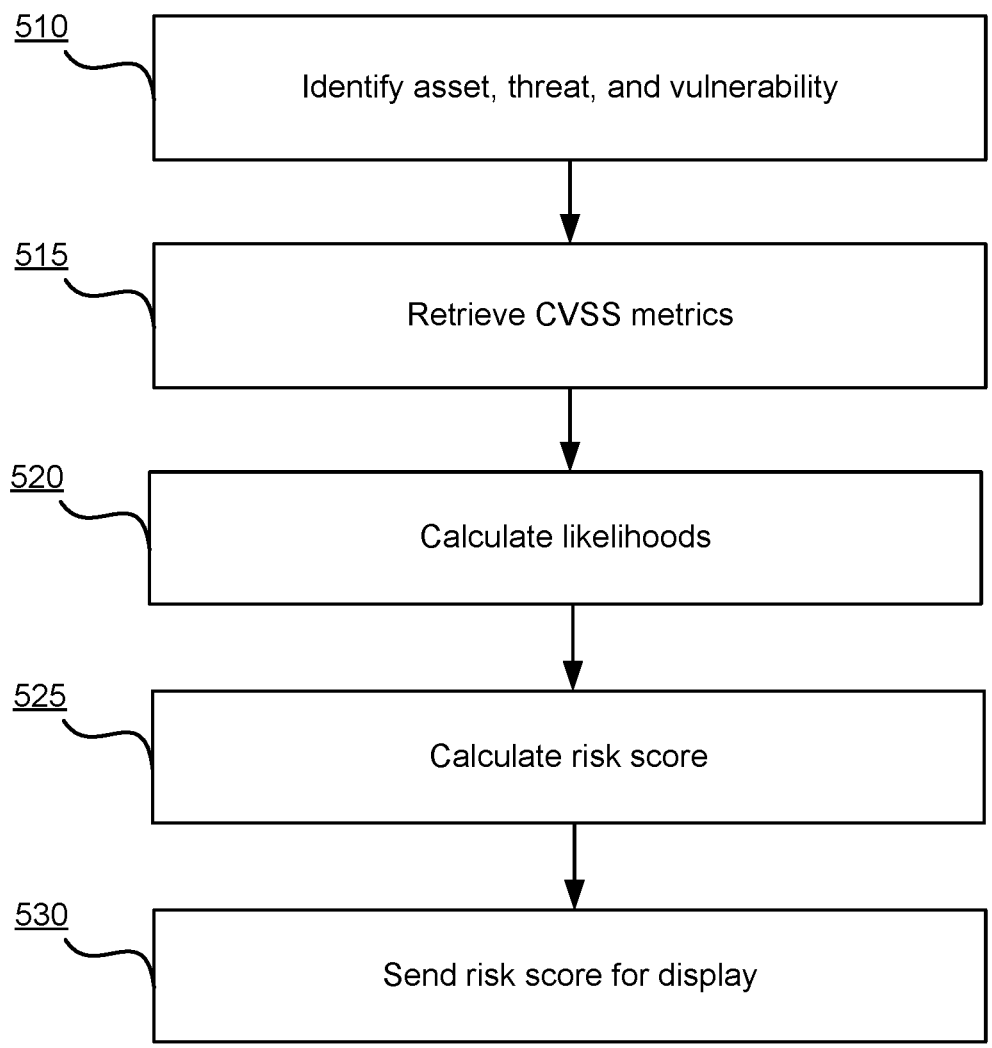
FIG. 5 is a flowchart illustrating a process for adaptive risk assessment, according to a second embodiment.

FIG. 5 is a flowchart illustrating a process for adaptive risk assessment, according to a second embodiment. The ARM 110 identifies 510 an asset, a threat to the asset, and a vulnerability of the asset. The ARM 110 retrieves 515 CVSS metrics for the asset. The ARM 110 calculates 520 likelihoods for the asset. The ARM 110 calculates 525 a risk score for the asset based on the calculated 520 likelihoods. The ARM 110 sends 530 the risk score for display, e.g., to an asset of the enterprise system 140. The asset of the enterprise system 140 to which the risk score is sent may be, for example, a laptop of a user of the ARM 110, such as a cybersecurity expert.

IV. Asset-Level Risk Reduction

As described above, the ARM 110 evaluates the risk of different parts of the enterprise system 140, such as business processes and assets. The application server 130 uses risk scores from the risk analysis engine 125 to generate user interfaces representing the risk scores. The user interfaces can drill down to the level of individual assets, where control gaps (e.g., threats and vulnerabilities) for each asset are displayed. The user interfaces can also display targeted recommendations for reducing risk. The targeted recommendations may be generated by the application server 130, e.g., based on analysis of which controls are available and used by an asset, and which control gaps exist for the asset.

Figure 7:
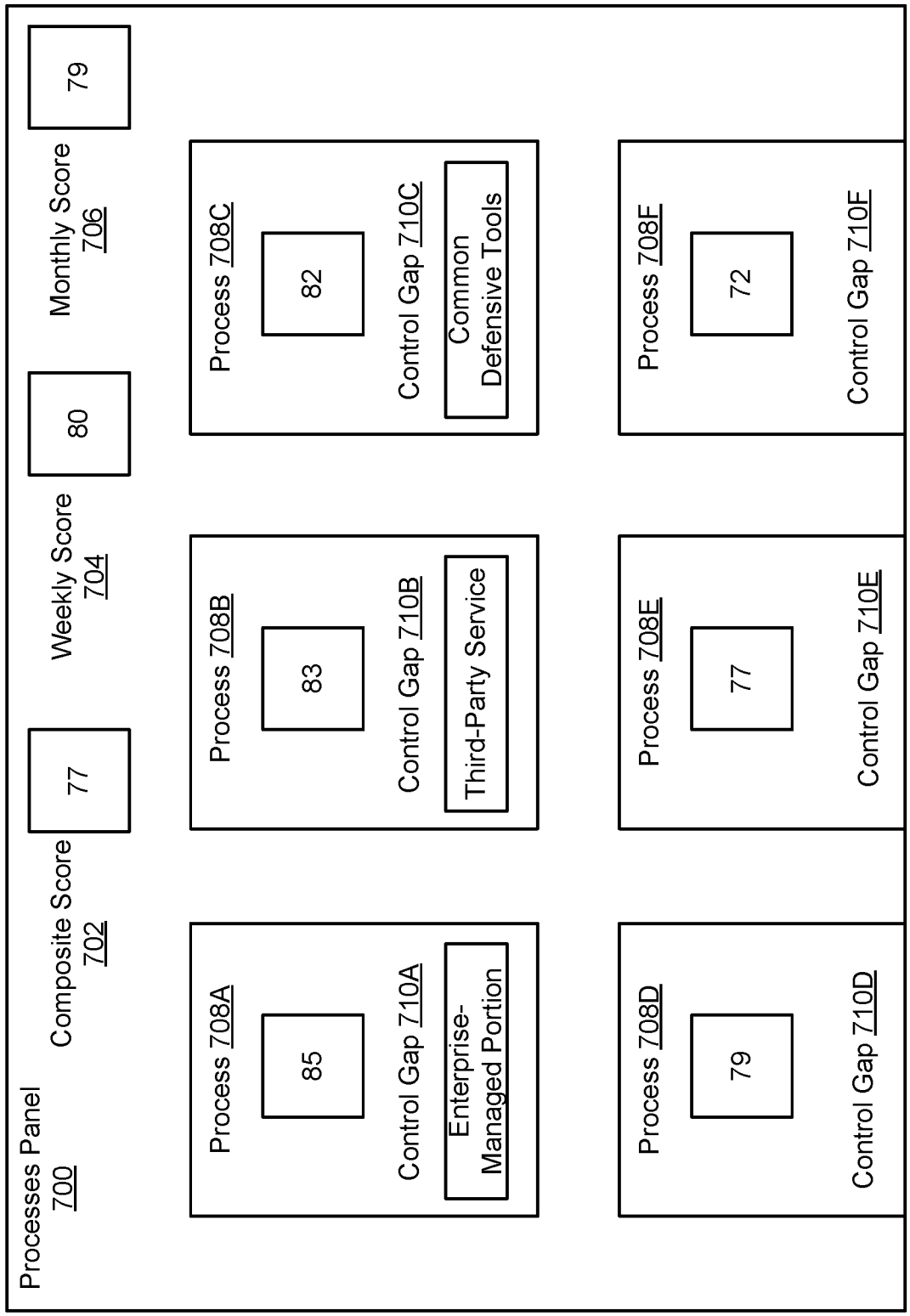
FIG. 7 is a simplified example of a user interface for process-level risk reduction, according to one embodiment.

FIG. 7 is a simplified example of a user interface for process-level risk reduction, according to one embodiment. The user interface is a processes panel 700, which lists some or all business processes in the enterprise system 140. Each business process 708 is represented in the processes panel 700 as a card that displays the risk of the business process. In an embodiment, the risk is specifically the residual risk of the business process. In an embodiment, hovering over the risk score on the card representing the business process 708 adjusts the score to display an inherent risk for the business process 708. In other embodiments, different approaches to displaying the residual and inherent risks may be used.

Each card may have a portion for a control gap 710 present for the respective business process. For example, business process 708A has a control gap 710A with regard to an enterprise-managed portion of the business process, and business process 708B has a control gap 710B with regard to a third-party service involved in the business process. The cards representing the business processes 708 can additionally include portions to indicate one or more of: top techniques for mitigating risk for the business process, a number of crown jewels associated with the business process, a number of assets associated with the business process, a number of assets with at least a threshold risk score, or an indicator of a last date of updating for the risk scores for the business process, depending upon the embodiment.

The processes panel 700 can additionally include a composite score 702 indicating an overall risk score for the business processes, which can be a weighted or unweighted average, depending upon the embodiment. Weights can be set, for example, by administrators of the ARM 110. The processes panel 700 can additionally include a weekly score 702, which indicates an average composite score for the past week for the business processes, and a monthly score 706, which indicates an average composite score for the past month for the business processes. In alternative embodiments, alternative or additional average scores may be included, such as a ten-day average. The composite scores may be generated by the application server 130.

Upon user interaction with a business process 708, e.g., a selection using a cursor, the application server 130 adjusts the user interface to display an assets panel for the selected business process 708 that lists the one or more assets involved with the business process.

Figure 8:
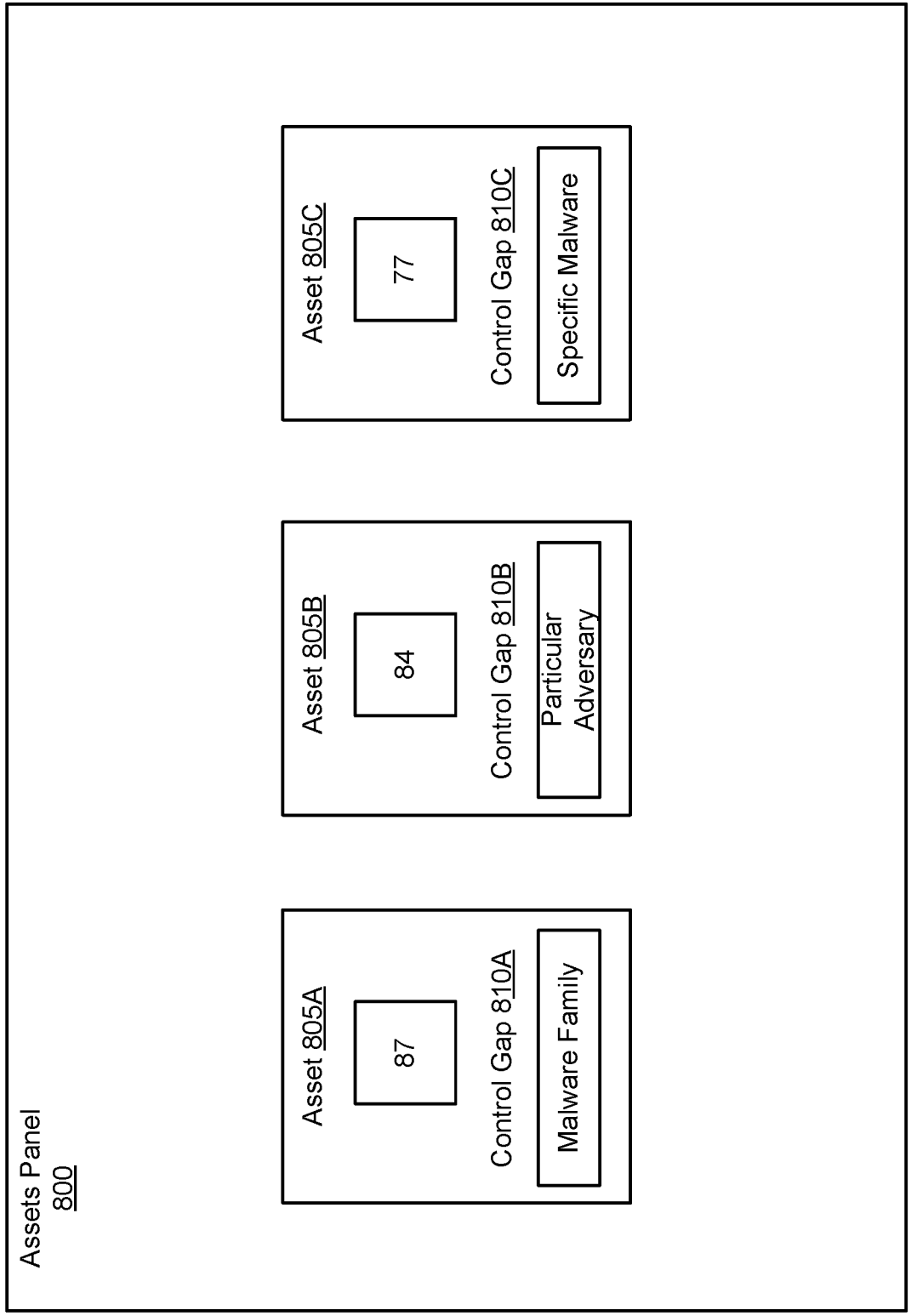
FIG. 8 is a simplified example of a user interface for inner-business process risk representation, according to one embodiment.

FIG. 8 is a simplified example of a user interface for inner-business process risk representation, according to one embodiment. The assets panel 800 lists assets corresponding to a particular business process, e.g., a business process 708 selected using a cursor. Each asset 805 is represented using a card, similar to the business processes in the processes panel 700. Each asset 805 has a risk score, such as 87 for asset 805A and 84 for Asset 805B. Each card may also display a control gap 810 for the respective asset 805, such as a certain malware family for asset 805A and a particular adversary for asset 805B. Selection of a particular card opens a user interface for asset-level risk reduction.

FIG. 9 is a simplified example of a user interface for asset-level risk reduction, according to one embodiment. The particular asset panel 900 displays various information about a particular asset, such as asset 805A. The particular asset panel 900 may display a risk score for the asset, as well as a detailed information panel 905, a recommendations panel 910, an installed applications panel 920, and a risk factors and mitigations panel 930.

The detailed information panel 905 lists information about the asset, such as its Internet Protocol (IP) address, type of asset, and physical location. For example, the asset may be a particular server type in California.

The recommendations panel 910 lists recommendations 912 with respective data sources 914 and importance ratings 916. The importance rating 916 may be "low," "medium," or "high" according to one embodiment, where the rating is based on one or more of a number of confirmed vulnerabilities, a risk of each vulnerability, and a time since last patching for the asset. Upon receiving user selection of a particular recommendation 912, the particular asset panel 900 may open a pop-up window that lists recommended actions, such as particular vulnerabilities to patch, and a respective change to residual risk score due to applying the patch.

The installed applications panel 920 lists applications installed on the asset 922, versions 924 of those installed applications, and publishers 926 of those installed applications. For example, the installed applications panel 920 may list an operating system, a version of the operating system, and a publisher of that operating system. As another example, the installed applications panel 920 may list a business software application, a version of the business software application, and a publisher of the business software application. Different assets 922 may have different applications installed and may therefore have different lists at the installed applications panel 920.

The risk factors and mitigations panel 930 lists tactics 932 for risk mitigation, technique names 934 for implementing the respective tactic, and risk mitigations 936 providing textual descriptions of the tactic.

Recommendations are targeted for particular assets based on vulnerabilities detected by the ARM 110 with respect to the asset. Recommendations may each include a control to implement to address the respective vulnerability, which may come with respective measures of effectiveness and messages to display using the user interface. If the threshold of the measure of effectiveness is breached, the recommendation may be targeted for the asset. For example, for Host-based security control maturity, a measure of effectiveness may be a number of host-based sensors per asset, and a sample recommendation may be "Increase asset sensor coverage; missing security program." For volume of vulnerability remediation, a measure of effectiveness may be the average number of application vulnerabilities, and a sample recommendation may be "application vulnerabilities too high; reduce." For timeliness of critical risk vulnerabilities patching, a measure of effectiveness may be an average time to patch critical vulnerabilities, and a sample recommendation may be "time to patch critical vulnerability too slow; improve." For timeliness of high risk vulnerabilities patching, a measure of effectiveness may be an average time to patch high vulnerabilities, and a sample recommendation may be "time to patch high vulnerability too slow; improve." For limiting blacklisted applications, a measure of effectiveness may be an average number of black-listed applications, and a sample recommendation may be "host has three black-listed applications; remove." For reducing users with elevated privileges, a measure of effectiveness may be a number of elevated users accessing the asset, and a sample recommendation may be "there are ten privileged users accessing this asset; reduce." For reducing suspicious user behavior, a measure of effectiveness may be an average number of alerts, and a sample recommendation may be "host experienced several user behavior anomalies; address."

The application server 130 may generate targeted recommendations. The application server 130 may retrieve vulnerability information for an asset, identify respective controls, and evaluate whether threshold measures of effectiveness have been breached. The application server 130 displays a list of targeted recommendations for a particular asset on the particular asset's panel. In this way, controls for addressing vulnerabilities may be automatically collected, analyzed, and recommended, with prioritization of high-risk vulnerabilities that have breached the threshold for the measure of effectiveness for the respective control. In some embodiments, some or all of the recommendations may be automatically implemented. For example, security patches may be automatically applied to a system.

V. Computing Machine Architecture

Figure 6:
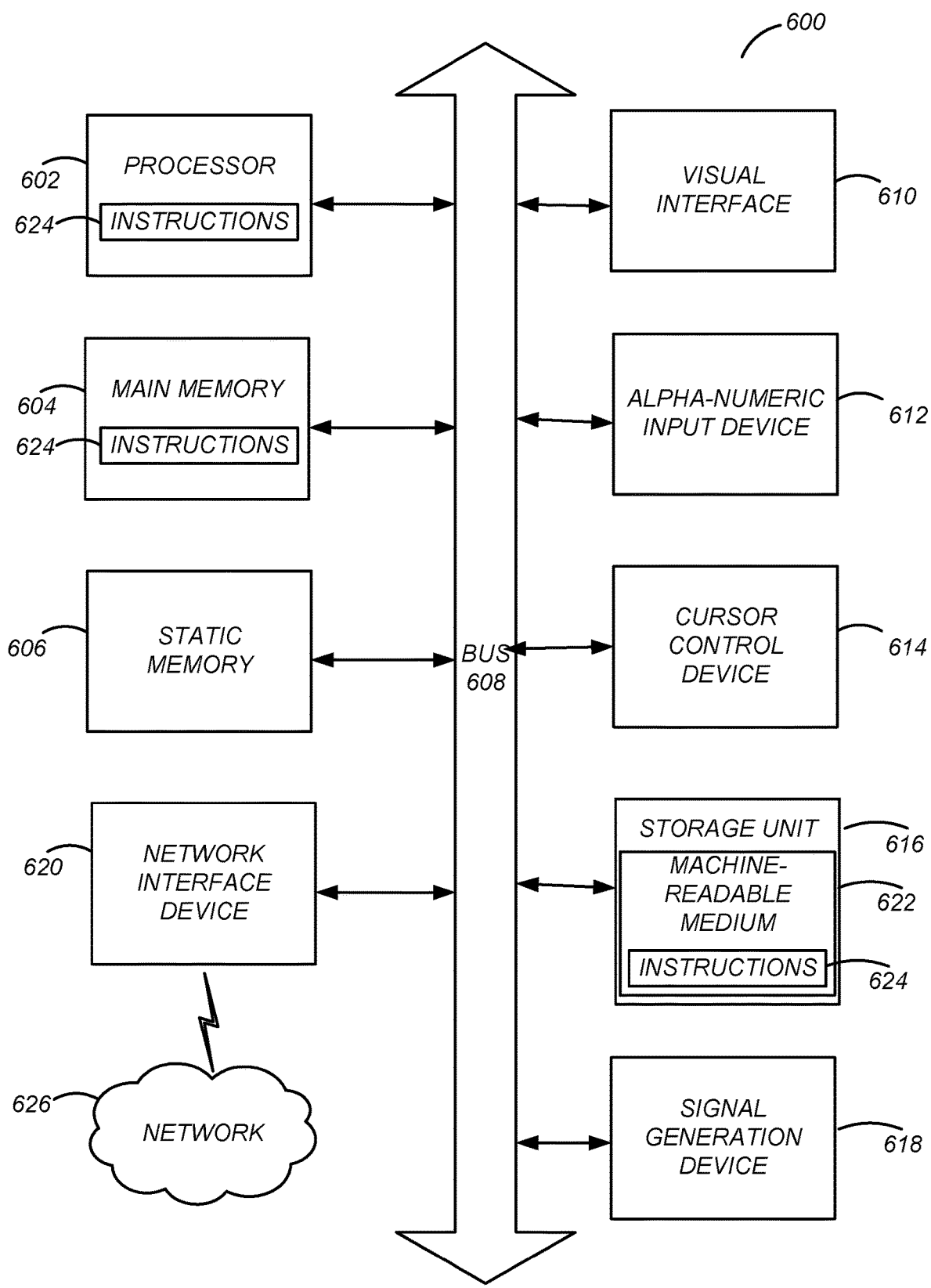
FIG. 6 is a block diagram illustrating components of an example machine able to read instructions from a machine-readable medium and execute them in a processor (or controller).

FIG. 6 is a block diagram illustrating components of an example machine able to read instructions from a machine-readable medium and execute them in a processor (or controller). Specifically, FIG. 6 shows a diagrammatic representation of a machine in the example form a computer system, within which program code (e.g., software or software modules) for causing the machine to perform any one or more of the methodologies discussed herein may be executed. The program code may be comprised of instructions 624 executable by one or more processors 602. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 600 includes a processor 602 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 604, and a static memory 606, which are configured to communicate with each other via a bus 608. The computer system 600 may further include visual display interface 610. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 610 may include or may interface with a touch enabled screen. The computer system 600 may also include alphanumeric input device 612 (e.g., a keyboard or touch screen keyboard), a cursor control device 614 (e.g., a mouse, a trackball, a joystick, a motion sensor, or other pointing instrument), a storage unit 616, a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. The instructions 624 (e.g., software) may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 (e.g., software) may be transmitted or received over a network 626 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store instructions (e.g., instructions 624). The term "machine-readable medium" shall also be taken to include any medium that is capable of storing instructions (e.g., instructions 624) for execution by the machine and that cause the machine to perform any one or more of the methodologies disclosed herein. The term "machine-readable medium" includes, but not be limited to, data repositories in the form of solid-state memories, optical media, and magnetic media.

V. Additional Considerations

The disclosed techniques may provide several advantages over existing cybersecurity systems. For example, the disclosed techniques provide fine-grained visualization and tracking of risk, both inherent and residual. The disclosed techniques also automate much of the cybersecurity process by automatically collecting and refreshing data about assets and threats, as well as maintaining user interfaces illustrating risk information. Threat simulation provides robust evaluation of potential vulnerabilities of an enterprise system 140.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1 and 2. Modules may constitute either software modules (e.g., code embodied on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 102, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for providing adaptive risk management through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the scope defined in the appended claims.

What is claimed is:

1. A method, comprising:
    retrieving data corresponding to an asset, wherein the asset is a computing device or software application of an enterprise system;
    identifying a set of vulnerabilities of the asset;
    for each vulnerability in the set of vulnerabilities, determining whether a respective measure of effectiveness of a respective security control has breached a respective threshold measure of effectiveness of the respective security control;
    for each vulnerability in a subset of the set of vulnerabilities, responsive to determining that the respective measure of effectiveness of the respective security control has breached the respective threshold measure of effectiveness of the respective security control, generating a targeted recommendation to implement a new security control on the asset for mitigating the vulnerability;
    generating a user interface for the asset comprising a list including each targeted recommendation;
    providing the user interface for display;
    receiving user selection of a particular targeted recommendation in the list, the particular targeted recommendation mitigating a particular vulnerability of the subset of vulnerabilities; and
    applying the security control identified by the particular targeted recommendation to the asset to mitigate the particular vulnerability.

2. The method of claim 1, wherein the user interface comprises a risk factors and mitigations panel that lists tactics for mitigating risk for the asset.

3. The method of claim 1, wherein the user interface comprises an installed applications panel listing software applications installed upon the asset.

4. The method of claim 1, further comprising:
    receiving a user interaction at a portion of a second user interface corresponding to the asset;
    wherein the user interface for the asset is generated responsive to receiving the user interaction.

5. The method of claim 1, wherein the user interface comprises a risk score for the asset.

6. The method of claim 5, wherein the user interface comprises an indicator of a potential change in risk score if recommendations are implemented.

7. A non-transitory computer-readable storage medium comprising stored computer program instructions that, when executed by a computing device, cause the computing device to:
    retrieve data corresponding to an asset, wherein the asset is a computing device or software application of an enterprise system;
    identify a set of vulnerabilities of the asset;
    for each vulnerability in the set of vulnerabilities, determine whether a respective measure of effectiveness of a respective security control has breached a respective threshold measure of effectiveness of the respective security control;
    for each vulnerability in a subset of the set of vulnerabilities, responsive to determining that the respective measure of effectiveness of the respective security control has breached the respective threshold measure of effectiveness of the respective security control, generate a targeted recommendation to implement a new security control on the asset for mitigating the vulnerability;
    generate a user interface for the asset comprising a list including each targeted recommendation;
    provide the user interface for display;
    receive user selection of a particular targeted recommendation in the list, the particular targeted recommendation mitigating a particular vulnerability of the subset of vulnerabilities; and
    apply the security control identified by the particular targeted recommendation to the asset to mitigate the particular vulnerability.

8. The non-transitory computer-readable storage medium of claim 7, wherein the user interface comprises a risk factors and mitigations panel that lists tactics for mitigating risk for the asset.

9. The non-transitory computer-readable storage medium of claim 7, wherein the user interface comprises an installed applications panel listing software applications installed upon the asset.

10. The non-transitory computer-readable storage medium of claim 7, wherein the computer program instructions further cause the computing device to:
    receive a user interaction at a portion of a second user interface corresponding to the asset;
    wherein the user interface for the asset is generated responsive to the user interaction.

11. The non-transitory computer-readable storage medium of claim 7, wherein the user interface comprises a risk score for the asset.

12. The non-transitory computer-readable storage medium of claim 11, wherein the user interface comprises an indicator of a potential change in risk score if recommendations are implemented.

13. A system, comprising:
    a processor; and a non-transitory computer-readable storage medium comprising stored computer program instructions that, when executed by the processor, cause the processor to:
    retrieve data corresponding to an asset, wherein the asset is a computing device or software application of an enterprise system;
    identify a set of vulnerabilities of the asset;
    for each vulnerability in the set of vulnerabilities, determine whether a respective measure of effectiveness of a respective security control has breached a respective threshold measure of effectiveness of the respective security control;
    for each vulnerability in a subset of the set of vulnerabilities, responsive to determining that the respective measure of effectiveness of the respective security control has breached the respective threshold measure of effectiveness of the respective security control, generate a targeted recommendation to implement a new security control on the asset for mitigating the vulnerability;
    generate a user interface for the asset comprising a list including each targeted recommendation;
    provide the user interface for display;
    receive user selection of a particular targeted recommendation in the list, the particular targeted recommendation mitigating a particular vulnerability of the subset of vulnerabilities; and
    apply the security control identified by the particular targeted recommendation to the asset to mitigate the particular vulnerability.

14. The system of claim 13, wherein the user interface comprises a risk factors and mitigations panel that lists tactics for mitigating risk for the asset.

15. The system of claim 13, wherein the computer program instructions further comprise:
    receive a user interaction at a portion of a second user interface corresponding to the asset;
    wherein the user interface for the asset is generated responsive to the user interaction.

16. The system of claim 13, wherein the user interface comprises a risk score for the asset.

17. The system of claim 16, wherein the user interface comprises an indicator of a potential change in risk score if recommendations are implemented.

\* \* \* \* \*